Oct. 19, 1937.    J. HALTENBERGER    2,096,541
AUTOMOBILE
Filed March 2, 1936    2 Sheets-Sheet 1
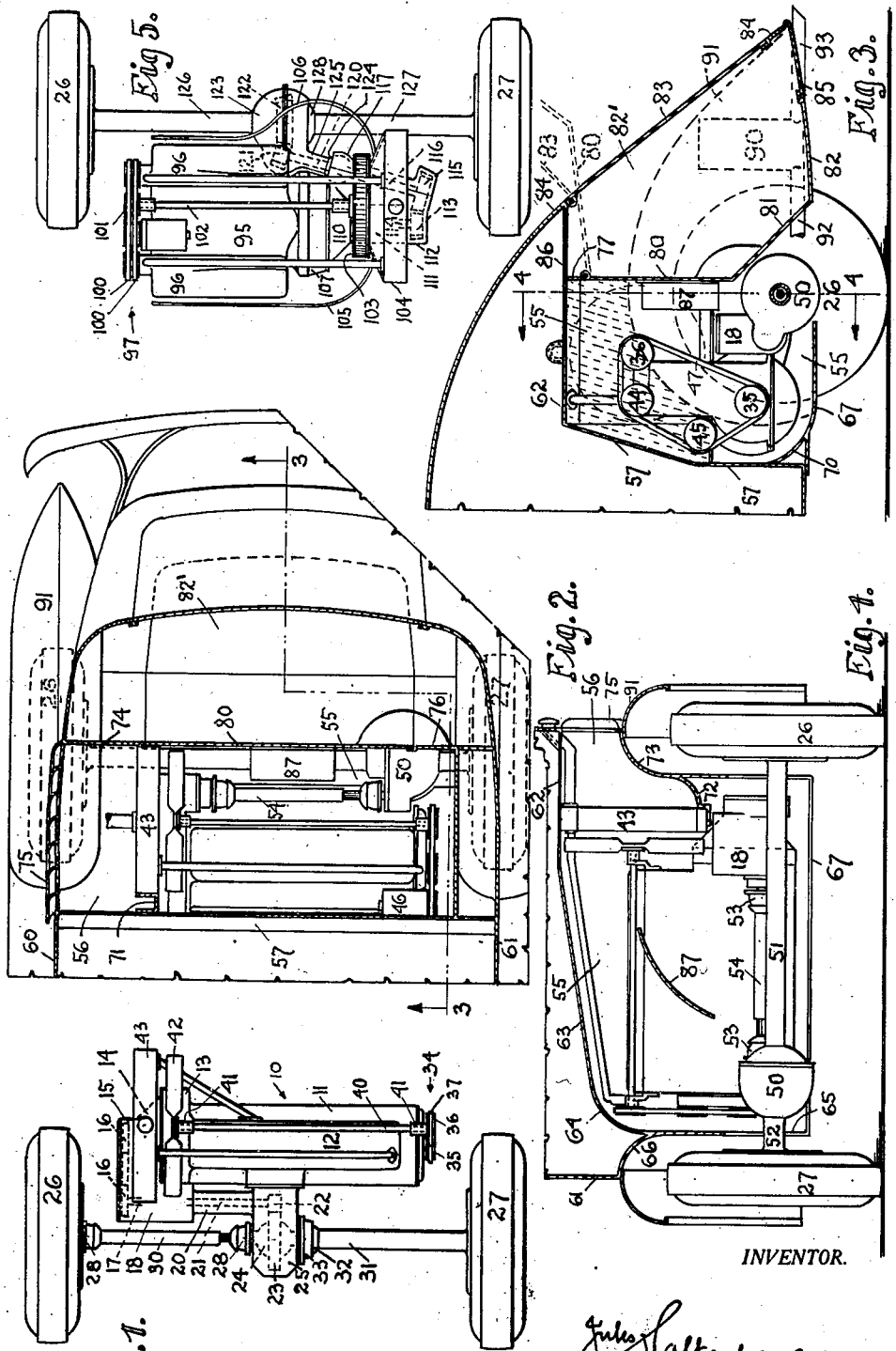
INVENTOR.
Jules Haltenberger

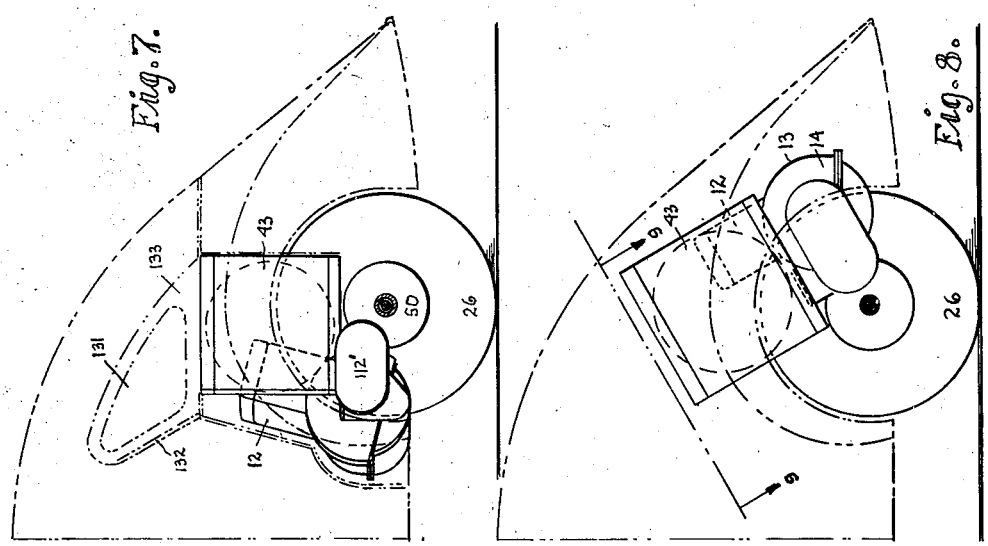
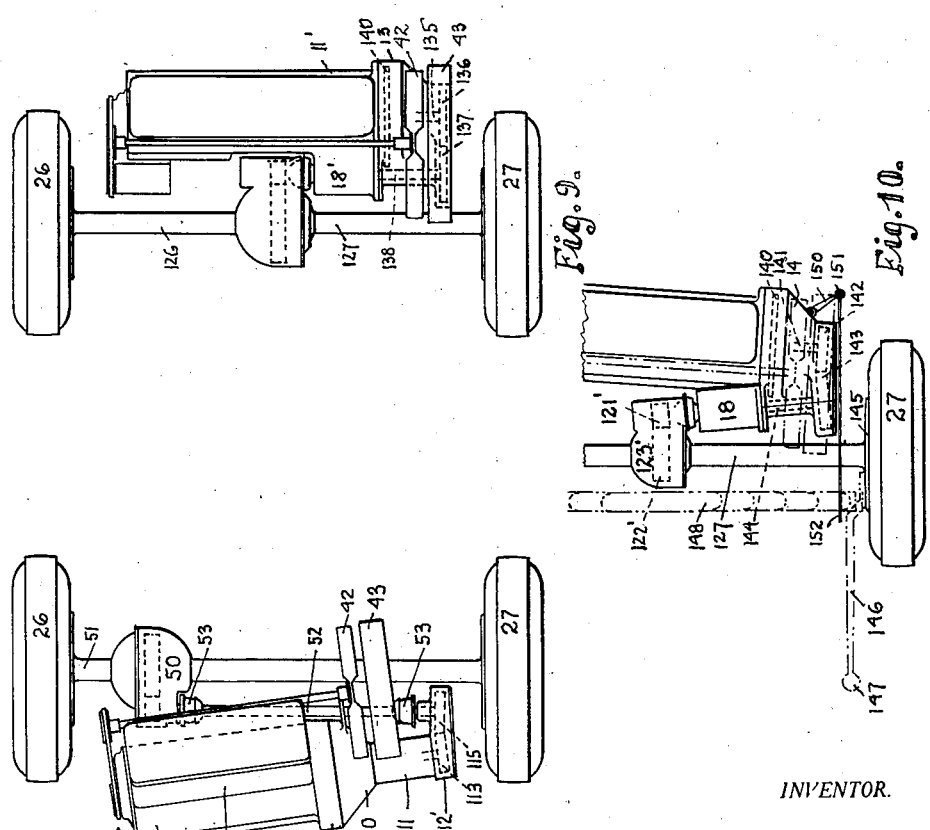

Patented Oct. 19, 1937

2,096,541

UNITED STATES PATENT OFFICE 2,096,541

AUTOMOBILE

Jules Haltenberger, Indianapolis, Ind.

Application March 2, 1936, Serial No. 66,522

18 Claims. (Cl. 180—54)

One of the objects of the present invention is to provide an automobile with a complete power plant, disposed transversely and positioned between the driving wheels. This invention is disclosed in my co-pending application Ser. No. 534,568 filed May 2, 1931, where a presently standard engine, standard clutch and transmission are arranged to drive the associated wheels. Standard engines consist of a row of cylinders, an accessory drive at one end and power output elements on the opposite end of the row of cylinders.

The present application is a continuation-in-part of the above patent application.

Further and more particularly expressed objects of the invention will appear as the description proceeds.

My invention may be embodied in the forms illustrated:

Fig. 1 is a plan view of the power plant and driving axle;

Fig. 2 is a fragmental plan view illustrating a modified power plant in the rear of an automobile;

Fig. 3 is a fragmental side elevation of the invention illustrating a section substantially on lines 3—3 of Fig. 2;

Fig. 4 is a fragmental rear elevation of the invention illustrating a section substantially on lines 4—4 of Fig. 3;

Fig. 5 is a modification, illustrating a V engine power plant and a connected hinged driving axle;

Fig. 6 is a further modification of the invention illustrating an in line power plant and a driving axle;

Fig. 7 is a side elevation of the power plant and axle illustrated in Fig. 6, schematically showing the rear end of an automobile;

Fig. 8 is a modification of the invention illustrated in Fig. 7;

Fig. 9 is a plan view of the power plant and axle substantially on line 9—9 of Fig. 8;

Fig. 10 is a further modification of the power plant and drive axle illustrated in Fig. 9.

Referring more particularly to the drawings and specifically to Fig. 1, it will be seen that a unit power plant generally at 10 is illustrated and disposed between the driving wheels.

Power plant 10 is composed of a crank case 11 containing the usual crank shaft; it supports a row of cylinders in a cylinder block 12, and terminates in a flywheel housing 13, housing a usual flywheel. To the housing is connected a clutch housing 14 surrounding a usual clutch and clutch shaft and terminating in a power transfer housing 15 containing power transfer gears 16. These gears are interposed between the usual shaft of the clutch in housing 14 and transmission shaft 17 in change-speed transmission housing 18. This change-speed housing inwardly terminates in a differential pinion shaft housing 20 surrounding a shaft 21 arranged to carry a differential driving pinion 22 and to drive a differential gear 23 and a differential 24 in housing 25.

Differential 24 distributes the driving power to the independently suspended wheels 26 and 27 either by universal joints in housing 28 and the interconnecting propeller shaft 30 or by an axle shaft in axle tubing 31 that inwardly terminates in a part spherical portion 32 surrounding a usual universal joint and acting as power connecter between the differential 24 and an axle shaft in axle tubing 31, and wheel 27 respectively. Spherical portion 32 acts as the hinge center for wheel 27 and is held by part spherical flange 33 to housing 25 permitting, however, the free oscillation of wheel 27 at the usual spring flexure. The mounting of wheel 27 is referred to in the trade as "hinged axle" and specifically "independent wheel suspension by a short hinged axle."

As is clear from Fig. 1 crank case 11 at the end opposite to the power output elements is provided with the usual accessory drive, generally at 34, consisting of at least the usual driving pulley 35 and usual driven fan pulley 36 and the usual interconnecting endless V belt 37. Pulley 36 is firmly attached to a fan shaft 40 carried by suitable bearings 41 and terminates in a fan 42 adjacent to radiator 43 which it is arranged to cool.

The space between driving wheels 26 and 27 in modern pleasure automobiles is limited to approximately 54" or less. By mounting the radiator above the power output elements and placing the fan between the radiator and the end of the cylinder block, at least 11% of the total available space is saved for other essentials. Further it is important that the fan drive of the present day engines be utilized. It is of great importance that a radiator, when on a transverse engine above the power output elements, be amply spaced from the nearest driving wheel to assure an unrestricted air supply—to be described.

Figures 2, 3 and 4 illustrate a modification of the invention. Here for simplification only those parts of the power unit and drive will be described which differ from the illustration and description of Fig. 1.

As is clear from Fig. 3 driving pulley 35 and driven fan pulley 36 are drivingly interconnected to pump pulley 44 and generator pulley 45 on generator 46 as by V belt 47.

As is also clear from the drawings the differential in housing 50 is integral with axle housings 51 and 52 and are arranged to drive wheels 26 and 27 by the usual axle shafts they surround. The driving power from change-speed transmission in housing 18 is transferred by universal joints in housings 53 and transverse propeller shaft 54 to the differential in housing 50, thereby completing the drive of the motive power from the cylinder blocks to the driving wheels.

The engine when located at the rear is deprived of the direct cooling air stream usual with front engines and front radiators. An efficient air control is however illustrated in Figs. 2, 3 and 4. Here a transverse deep engine chamber 55 and a shallow air inlet chamber 56 are formed by a front wall 57 that connects the body right panel 60 and left panel 61. Top wall 62 is also connected to right panel 60, and towards the left side of the automobile, it is formed into a descending top wall 63 and air deflecting curved wall 64, and vertical wall 65. This wall also forms the inner wall of left wheel house 66.

Under the powerplant, for access to the engine interior, a removable tray 67 is provided which has an air deflecting wall 70 contacting with front wall 57.

Chambers 55 and 56 are separated by radiator 43 and spacer 71. Air inlet chamber 56 is also provided with a tray 72, formed as a part of the right wheel house 73, and a rear wall 74 connecting the right panel 60 to the right half of the rear wall of radiator 43, and tray 42 respectively. Body right panel 60 between front wall 57 and rear wall 74 is provided with air admission louvres 75. As is clear from the drawings, chamber 56 is a closed chamber except as to the air admission louvres and the core of the radiator. The space between the louvres and the radiator is more than the double thickness of the radiator and is, therefore, ample to efficiently change the direction of the incoming air.

The rear wall of chamber 55 is made of a stationary side wall 76 and a depending stationary wall 77, as is clear in Fig. 3. On this depending wall is hinged the main rear wall 80, on the bottom formed into an air Venturi wall 81 and tray 82. The rear face of walls 80 and 81 and the rear face of walls 76 and 74 form the front wall of a luggage space 82'.

Luggage space 82' at the rear is closed by door 83, a continuation of the body, top and rear panel 84, and on the bottom the door rests on a ledge of panel 84. Access to the luggage space 82' is reached through door 83. When this door is open (illustrated by dotted lines) wall 80 and associated parts can be swung through this opening (indicated by dotted lines) to give access to the engine and associated parts. It will be noted that the rear part of tray 82 seats on a stationary tray 85, a part of body rear panel 84; the top wall of luggage space 82' is formed of a horizontal wall 86, in part the continuation of top wall 62. As is clear, particularly from Fig. 3, the angle and location of Venturi wall 81 are carefully positioned in relation to the rear edge of tray 67 and are arranged to cause a partial vacuum in engine chamber 55 when the automobile is traveling forward. Tray 67 also serves to protect the bottom of the engine from mud coating.

To facilitate the escape of warm air from engine chamber 55 the top wall 63, as described, is provided with an air deflecting curve 64, to efficiently change the direction of the heated air flow from substantially horizontal to substantially vertical. To further assist such directional change, hinged wall 80 at its front is provided with a curved air deflecting blade 87, which is particularly clear from Fig. 4.

To increase the available luggage space 82' a muffler 90 of the "inflow and outflow" type is mounted in the tail end of wheel fender 91, and is connected to the usual engine exhaust manifold by inlet pipe 92 and the gases are emitted through tail pipe 93.

To achieve simplicity of presentation Figs. 1, 2, 3 and 4 illustrate the engine with vertical cylinders. For certain purposes it is desired that they should lean toward the axle they drive. Further, the engine chambers should have isolated or double walls. This is illustrated, however, in my co-pending application and it is believed further reference here would be duplication.

Fig. 5 illustrates a further modification of my invention. Here a V engine 95 has two blocks of cylinders 96. At one end the engine has the usual accessory drive, generally at 97. Here, however, all pulleys are doubled and two V belts 100 are used to assure a fan drive which, generally, does not require attention. Fan pulleys 101 are firmly attached to fan shaft 102 terminating in a "sirocco" fan 103 arranged to draw the air through a "shrouded" radiator 104.

Sirocco fans expel the air radially, to change the direction of the air flow to longitudinal of the engine, and especially to cool the usual exhaust manifolds at the under side of cylinders 96 deflecting walls 105 and 106 are provided.

As is also clear from Fig. 5 the engine on the end opposite to the accessory drive terminates in a flywheel housing 107 containing a usual flywheel. To it is attached a usual clutch housing 110 and usual change-speed transmission in transmission housing 111, terminating in a power transfer housing 112. This housing contains a pair of bevel gears, driving gear 113 on clutch shaft 114 and driven gear 115 on transfer shaft 116. This shaft terminates in a universal joint in a spherical housing 117. To the universal joint is connected another shaft 120 terminating in a differential bevel driving pinion 121 arranged to drive differential bevel gear 122 in differential housing 123. Spherical housing 117 embraces a part spherical ball 124 arranged to serve as by a neck which surrounds shaft 117 as a fulcrum point of the primary unit of a long hinged axle 126 carrying wheel 26. The differential housing 123 of the primary unit is arranged to serve as the fulcrum of the secondary unit 127 carrying wheel 27 as by part spherical end 128.

Double V belts are not new with me, nor sirocco fans. Applicant believes he arrived at a new result by using double V belts in an inaccessible rear engine particularly with the connection of a sirocco fan and exhaust manifold cooling air deflector system.

A further modification of the invention is illustrated in Figs. 6 and 7. Here an "in line" power plant generally at 130 has a crank case 11 and one row of cylinders in cylinder block 12 and fan drive generally at 34. These were described in connection with Figs. 1, 2, 3 and 4.

The power output elements have the same numerals as described in connection with Fig. 5 with the clear distinction, however, that here power transfer housing 112' is a separate unit and it is attached to the end of a standard change speed transmission 111. The drive from the driven gear 115 to wheels 26 and 27 has the same numerals as described in connection with Figs. 2, 3 and 4.

It will be noted that the power plant 130 is at a slight angle to the rear axle center line as is clear from Fig. 6. This angle is approximately 8°. This has many advantages: this construction permits the engine to be placed close to the axle housing, when in front of the axle as illustrated, but little of the passenger space need be sacrificed for the engine. To further diminish the amount of space required the engine is tilted towards the axle. When this power plant is placed to the rear of the axle (not shown) by the slight angle mounting of the power plant and by the tilting of same towards the axle, the weight overhang is reduced.

It will also be noted that the complete power plant is a duplication of the ones presently used by most manufacturers with the exception of the attached transfer gear housing 112', making for facility and economy of adoption.

Fig. 7 also illustrates in a schematical way a new air admission method to the air inlet chamber and radiator respectively. Here a rear window 131, usual with the body style indicated, provides for the admission of air by omitting or displacing the window pane from same; and to prevent the engine noise from reaching the body interior glass walls 132 and a glass panel 133 are arranged to form a transparent but sealed air channel for the admission of the outside air to the engine chamber.

Figs. 8 and 9 illustrate a further modification of the invention. The numerals are those from Figs. 1, 2, 3, 4 and 5 and it is believed only the specific feature should be described to avoid unnecessary repetition of descriptions.

Here a change speed transmission in housing 18' is integral with crank case 11'. The power transfer means include a clutch shaft 135, driving spur gear 136, driven spur gear 137 and transmission drive shaft 138.

It will be noted that transmission drive shaft 138 is positioned as close to clutch shaft 135 as the outside diameter of the usual flywheel or a starting gear 140, usually mounted thereon, permits.

This construction can produce a light powerplant and with a relatively short stroke engine can be made at small expense when in quantity production.

Fig. 10 illustrates a modification similar to the one described in connection with Figs. 8 and 9 and it is more especially for use when the engine is not short stroke. Here a clutch shaft 141 carries a driving bevel gear 142 meshing with a driven bevel gear 143 on a transmission drive shaft 144. This shaft is arranged to clear the periphery of the usual flywheel starting gear 140, and is operatively connected to a change speed transmission in housing 18.

By placing the transmission drive shaft 144 as near to the flywheel as possible and at the same time on a slight angle, it becomes possible to use a small diameter transfer gear and also possible to use a relatively long stroke engine as the change speed transmission is further removed from the crank case. Fig. 10 illustrates an 8° angle between these shafts.

It will be noted that whereas these two shafts are at an 8° angle to each other in relation to the rear axle centerline, the angle is substantially divided. This has many advantages—it increases the clearance between the axle housing 127 and the driven bevel gear 143, in fact so materially as to permit here a gear reduction ratio at gear 143 by making it larger than the associated gear 142. This speed reduction ratio correspondingly reduces the differential gear ratio in differential housing 123' where, while retaining the outside diameter of differential driving bevel pinion 121' as a necessary minimum for strength and teeth contacts, the differential driven bevel gear diameter 122' is materially reduced in turn to decrease the diameter of differential housing 123' to assure more road clearance. The diameter reduction is of particular importance in case of a hinged axle where the differential housing itself ascends and descends at the usual spring flexure. The illustration shows a 4 to 1 over all gear reduction between the clutch shaft and differential.

Fig. 10 schematically illustrates also an integral distance rod drive. Here axle housing 127 is integral with a brake flange 145. Integral therewith is a distance rod 146 terminating in a ball 147 with suitable attachment to the automobile (not shown) arranged to take the drive and this ball also serves to take the brake reaction in relation to the transverse spring 148.

It also illustrates a clutch release mechanism. Here a usual clutch release lever 150 is operatively anchored on clutch housing 14, outwardly terminating in an eyelet 151 to serve as an anchor for a thin steel tape 152, which reaches in front of the axle housing 127 where preferably it is connected with a Bowden wire (not shown) which is connected to the usual clutch pedal (not shown).

Applicant claims as his invention:

1. In an automobile, a pair of driving wheels, a multi-cylinder liquid cooled internal combustion engine having a cylinder block, an accessory drive at one end of said block, and a power output element on the opposite end of said block, said engine being disposed transversely and positioned between said wheels, a radiator above said power output element, a fan associated therewith, and driving means interconnecting said fan and said accessory drive.

2. In an automobile, a pair of driving wheels, a multi-cylinder liquid cooled internal combustion engine having a cylinder block, an accessory drive at one end of said block, and a power output element on the opposite end of said block, said engine being disposed transversely and positioned between said wheels, a radiator above said power output element, a sirocco fan associated therewith, and driving means interconnecting said fan and said accessory drive.

3. In an automobile, a pair of driving wheels, a multi-cylinder liquid cooled internal combustion engine having a cylinder block, an accessory drive at one end of said block, and a power output element including spur gears on the opposite end of said block, said engine being disposed transversely and positioned between said wheels, a radiator above said power output element, a fan associated therewith, and driving means interconnecting said fan and said accessory drive.

4. In an automobile, a pair of driving wheels, a multi-cylinder liquid cooled internal combustion engine having a cylinder block, an accessory drive at one end of said block, and a power output element including bevel gears on the opposite end of said block, said engine being disposed transversely and positioned between said wheels, a radiator above said power output element, a fan associated therewith, and driving means interconnecting said fan and said accessory drive.

5. In an automobile, a pair of driving wheels, a multi-cylinder liquid cooled internal combustion engine having a cylinder block, an accessory drive at one end of said block, and a power output element including a shaft on a slight angle to a vertical plane dissecting said wheel centers, on the opposite end of said block, said engine being disposed transversely and positioned between said wheels, a radiator above said power output element, a fan associated therewith, and driving means interconnecting said fan and said accessory drive.

6. In an automobile, a pair of driving wheels, a multi-cylinder liquid cooled internal combustion engine having a cylinder block, an accessory drive at one end of said block, and a power output element including two driving shafts on a slight angle to a vertical plane dissecting said wheel centers, on the opposite end of said block, said engine being disposed transversely and positioned between said wheels, a radiator above said power output element, a fan associated therewith, and driving means interconnecting said fan and said accessory drive.

7. In an automobile, a pair of driving wheels, a multi-cylinder liquid cooled internal combustion engine having a cylinder block, an accessory drive at one end of said block, and a power output element including a clutch, a change speed transmission, and power transfer gears, in progression, on the opposite end of said block, said engine being disposed transversely and positioned between said wheels, a radiator above said power output element, a fan associated therewith, and driving means interconnecting said fan and said accessory drive.

8. In an automobile, a pair of driving wheels, a multi-cylinder liquid cooled internal combustion engine having a cylinder block, an accessory drive at one end of said block, and a power output element including a pair of spur gears on the opposite end of said block, and a change speed transmission at the side of said block, said engine being disposed transversely and positioned between said wheels, a radiator above said power output element, a fan associated therewith and driving means interconnecting said fan and said accessory drive.

9. In an automobile, a pair of driving wheels, a multi-cylinder liquid cooled internal combustion engine having a cylinder block, an accessory drive at one end of said block, a power output element including a pair of bevel gears on the opposite end of said block, a change speed transmission at the side of said block, said engine being disposed transversely and positioned between said wheels, a radiator above said power output element, a fan associated therewith, and driving means interconnecting said fan and said accessory drive.

10. In an automobile, a pair of driving wheels, an engine chamber having air downwardly deflecting means, a multi-cylinder liquid cooled internal combustion engine having a cylinder block, an accessory drive at one end of said block and a power output element on the opposite end of said block, said engine being disposed transversely and positioned in said chamber and between said wheels, a radiator above said power output element, a fan associated therewith, and driving means interconnecting said fan and said accessory drive.

11. In an automobile, a pair of driving wheels, an engine chamber having air downwardly deflecting and Venturi air expelling means, a multi-cylinder liquid cooled internal combustion engine having a cylinder block, an accessory drive at one end of said block and a power output element on the opposite end of said block, said engine being disposed transversely and positioned in said chamber and between said wheels, a radiator above said power output element, a fan associated therewith, and driving means interconnecting said fan and said accessory drive.

12. In an automobile, a pair of driving wheels, an engine chamber and a luggage space having a hinged wall therebetween, a multi-cylinder combustion engine having a cylinder block, an accessory drive at one end of said block, and a power output element on the opposite end of said block, said engine being disposed transversely and positioned in said engine chamber and between said wheels, a radiator above said power output element, a fan associated therewith and driving means interconnecting said fan and said accessory drive.

13. In an automobile, a pair of driving wheels, a multi-cylinder liquid cooled internal combustion engine having a cylinder block, an accessory drive at one end of said block, and a power output element on the opposite end of said block, said engine being disposed transversely and positioned between said wheels, a radiator in proximity to said power output element, a fan associated therewith, and driving means interconnecting said fan and said accessory drive.

14. In an automobile, a pair of driving wheels, an engine chamber and a luggage space having a hinged wall therebetween, a multi-cylinder combustion engine disposed transversely and positioned in said engine chamber and between said wheels, a radiator in said chamber, a fan associated therewith and driving means interconnecting said fan and said engine.

15. In an automobile, a pair of rear driving wheels, housings over said wheels having a rearwardly extended space, an engine chamber and a luggage space having a hinged wall therebetween, a multi-cylinder combustion engine having an exhaust pipe, said engine being disposed transversely and positioned in said engine chamber and between said wheels, a silencer in said rearwardly extended space and a pipe line connection, connecting said silencer and said exhaust pipe.

16. In an automobile, a pair of driving wheels, an engine chamber and a luggage space having a wall therebetween, a multi-cylinder combustion engine disposed transversely and positioned in said engine chamber and between said wheels, a radiator in said chamber, a fan associated therewith and driving means interconnecting said fan and said engine.

17. In an automobile, a pair of driving wheels, an engine chamber and a luggage space having a wall therebetween, a multi-cylinder combustion engine disposed transversely and positioned in said engine chamber and between said wheels, a fan in said chamber and driving means interconnecting said fan and said engine.

18. In an automobile, a pair of rear driving wheels, housings over said wheels having a rearwardly extended space, an engine chamber and a luggage space having a wall therebetween, a multi-cylinder combustion engine having an exhaust pipe, said engine being disposed transversely and positioned in said engine chamber and between said wheels, a silencer in said rearwardly extended space and a pipe line connection, connecting said silencer and said exhaust pipe.

JULES HALTENBERGER.